Oct. 20, 1936.   G. L. MOREHEAD   2,058,346
COUNTERBALANCED CRANK FOR DRIVE SHAFTS
Filed June 23, 1927   2 Sheets-Sheet 1
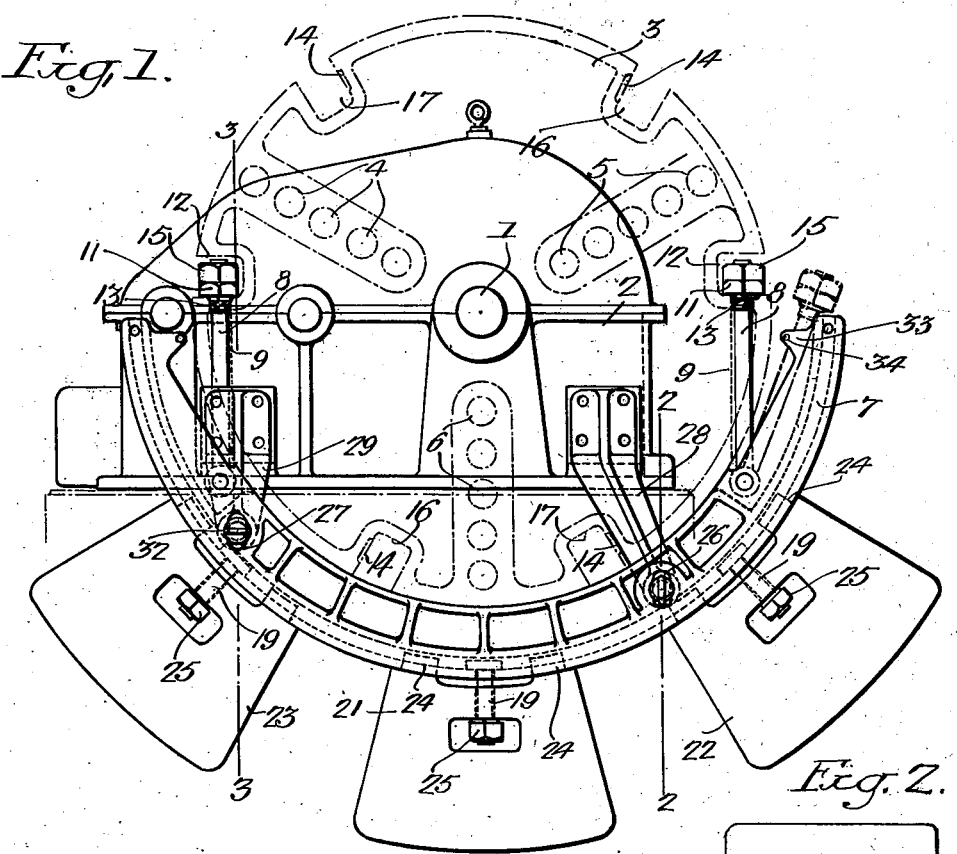
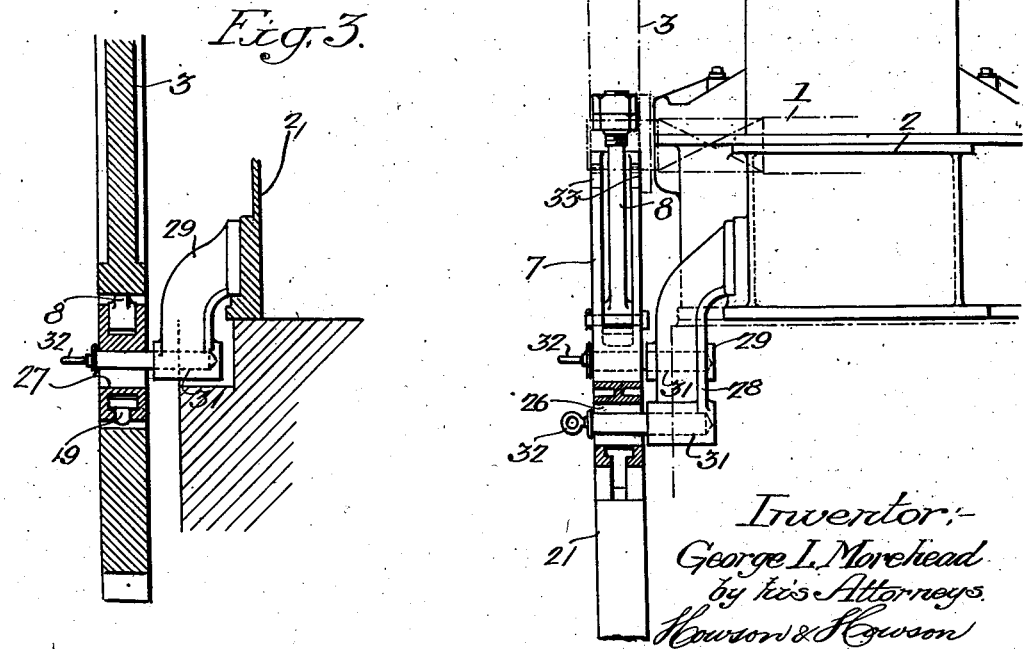
Inventor:-
George L. Morehead
by his Attorneys
Howson & Howson

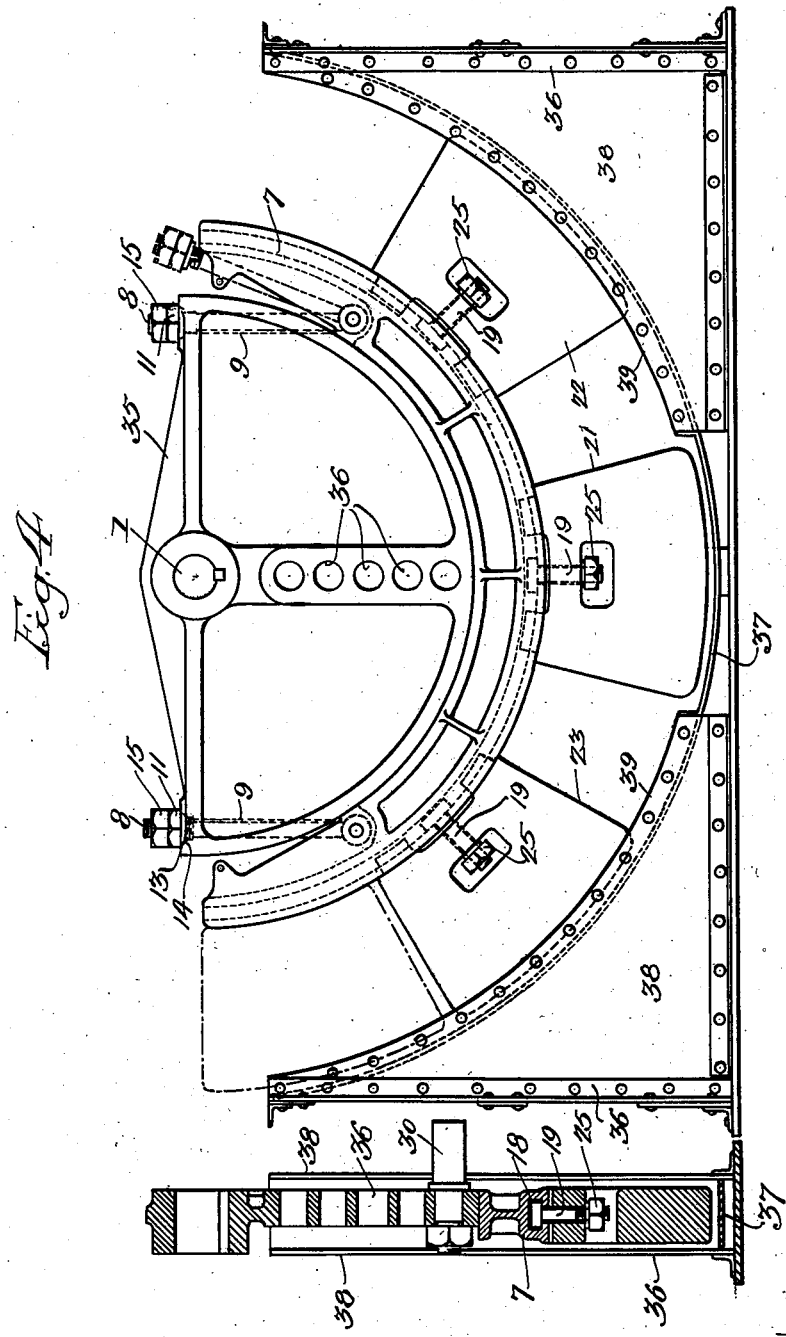

Patented Oct. 20, 1936

2,058,346

UNITED STATES PATENT OFFICE 2,058,346

COUNTERBALANCED CRANK FOR DRIVE SHAFTS

George L. Morehead, Elkins Park, Pa., assignor to Link-Belt Company, Chicago, Ill., a corporation of Illinois Application June 23, 1927, Serial No. 200,908

26 Claims. (Cl. 74—591)

My invention relates to improvements in counterweighting devices, and is particularly applicable to driving mechanism for oil well pumps, drills and like apparatus whose use for reciprocating relatively heavy parts makes desirable, if not necessary, the use of counterweights, but which are frequently used for purposes, such as hoisting, in which the presence of counterweights not only is unnecessary but frequently undesirable.

The principal object of the present invention is to provide a counterweighting device so formed as to be readily attachable and detachable so that the counterweights may be applied or removed with a minimum of labor and loss of time.

Another object of the invention is to provide a counterweight device having the above characteristics and in which provision is made for obtaining a desirable distribution or arrangement of one or more weight elements.

A further object of the invention is to provide a counterweight assembly including one or more separately adjustable weight elements which may be attached and detached from the counterweighted mechanism without disturbing the relative setting of the said weight elements.

A still further object of the invention is to provide a counterweight assembly having the general characteristics outlined above which will be cooperative with a crank shaft assembly having provision for adjusting the angular position of the crank with respect to the shaft, to the end that the entire counterweight assembly may be readily attached in any crank position.

The invention also contemplates the provision of means for supporting the counterweight assembly when detached in a position closely adjacent the crank mechanism and in position for immediate re-attachment whereby the detaching and reattaching operations are materially facilitated.

In the attached drawings:

Figure 1 is a front view of a counterweight assembly made in accordance with the present invention;

Figure 2 is a section on the line 2—2, Fig. 1;

Fig. 3 is a section on the line 3—3, Fig. 1, but showing the position assumed by the counterweight assembly when detached from the crank shaft;

Fig. 4 is a front elevational view illustrating a modification within the scope of the invention, and Fig. 5 is a section on the line 5—5, Fig. 4.

With reference to Figs. 1 to 3, I have shown at 1 a crank shaft of an oil well pump drive unit, this pump comprising also a housing the forward portion of which is shown at 2. The crank shaft 1 carries at its outer end a crank in the form in the present instance of a circular disk 3 having three radially arranged sets of openings, 4, 5 and 6 respectively, in any one of which openings may be secured a crank pin (not shown), thereby affording an adjustment of the crank pin position both angularly and radially with respect to the shaft 1. This device for adjusting the crank pin position has certain material advantages, particularly in drive units employing a gear transmission between the crank shaft 1 and the prime mover, as clearly set forth in my co-pending application Serial Number 177,970.

The counterweight assembly forming the principal novel feature of the present invention consists as illustrated in a saddle 7 of substantially semicircular form which is adapted to be secured in predetermined positions to the periphery of the disk 3. In the present instance, the saddle has pivotally secured to the inner side thereof a pair of bolts 8, 8 which as shown in Fig. 1 are adapted to occupy positions in peripheral slots 9 in the disk 3, in which positions nuts 11 on the said rods occupy oppositely arranged recesses 12 in the periphery of the disk and thereby are made to support the saddle 7 in a position, as shown, tight against the periphery of the disk. It will be apparent that by turning the nuts 11 in the recesses 12 the saddle may either be tightly drawn up against the periphery of the disk or may be lowered away from the periphery.

Each of the nuts 11 is provided on its under side with a boss 13 which seats in a recess 14 in what constitutes the under sides of the recesses 12, whereby there is no tendency for the bolts 8 to inadvertently move outward from the slots to accidentally release the saddle. Lock nuts 15 are also provided to prevent loosening of the nuts 11 on the bolts.

It will be noted by reference to Fig. 1 that the recesses 12 are arranged symmetrically on opposite sides of the radial line through the series of holes 6 whereby the saddle 7 is supported against the disk in a symmetrical position with regard to these pin holes. Oppositely arranged recesses 16, 16 and 17, 17 similar to the recesses 12 are also provided to permit securing the saddle in the corresponding position with respect to the series of holes 4 and 5 respectively.

As illustrated, the saddle 7 is provided in its outer peripheral surface with a longitudinal T-slot 18, this slot being adapted for reception of the heads of bolts 19 by means of which one or more weight elements 21, 22 and 23 may be secured to the outer face of the saddle. In a preferred form, each of the weight elements is provided with extensions 24 on the inner side which project into the slot 18 and with the bolt 19 hold the weights firmly in position on the saddle. By loosening the nuts 25 on the bolts 19, the weights may either be entirely removed or may be adjusted to any desired position longitudinally of the saddle, and secured in the adjusted position by re-tightening the said nuts. Where, as in the present instance, a plurality of weight elements are employed, the counterweight effect may be varied from a maximum—in which the weight elements 22 and 23 lie against the sides of the weight element 21, which as illustrated retains its position in alignment with the openings 6—to a minimum in which the elements 22 and 23 are moved as far as possible towards the ends of the saddle.

With reference to Figs. 1 and 2, it will be noted that the saddle is provided with a pair of transverse slots 26 and 27, which, when the saddle is in the dependent position, as shown in Fig. 1, are substantially vertical in their longitudinal axes. In conjunction with these slots, the housing 2 carries a pair of depending bracket arms 28 and 29 each having at its lower end and in its forward face a socket 31, which, when the saddle is secured in operative position on the disk, register respectively with the lower or midportions of the slots 26 and 27, as shown in Figs. 1 and 2. Also as shown in the latter figure, the forward faces of the socketed portions of the arms 28 and 29 lie closely adjacent the rear face of the saddle. Under these circumstances, with the saddle in the dependent position, as shown in Fig. 1, the said slots and sockets being in alignment, it is possible to insert pins 32 through the slots 26 and 27 from the outer face of the saddle and into the sockets 31 in the bracket arms. Thereafter, the nuts 11 and 15 on the upper ends of the retaining bolts 8 may be backed off to an extent first permitting the saddle to sink away from the disk 3 until it is supported upon the pins 32, and secondly to entirely release the bolts to permit their being turned outwardly on their pivots into a position clear of the disk 3 and supported in the upper ends of the saddle, as indicated in dotted lines in Fig. 1. In order to positively retain the bolts in this position and prevent accidental movement into contact with the disk 3, I provide on the saddle and at opposite sides of the bolt when in the retracted position a pair of lugs 33 apertured at their outer ends, as indicated at 34, for reception of a retaining pin.

Under these circumstances, it will be apparent that the saddle is supported in a position entirely clear of the disk 3, which permits free operation of the shaft 1 independently of the counterweights, as at times may be desirable in the type of mechanism to which this invention particularly relates. While the saddle and the weights are entirely clear of the disk 3, it will be apparent that the entire counterweight assembly is supported in a position in which it may readily and quickly be re-attached to the disk in any of the three positions which, in the present instance, are provided for it. The operation of re-attaching the counterweight assembly consists merely in turning the bolts inwardly into the recesses and pockets provided for their reception in the disk 3, thereafter tightening the nuts 11 and 15 until the saddle is drawn tightly up against the periphery of the disk, thereafter retracting the saddle-supporting pins 32.

In Figs. 4 and 5, I have illustrated a modification of the device within the scope of the invention. In this instance, the shaft 1 carries a crank in the form of a semicircular disk 35 having a single line of radial holes 36 for reception of a crank pin 30 and having at opposite sides the aforedescribed peripheral recesses 9 for the reception of the saddle-retaining bolts 8. A seat is provided for a nut 11 on each of the bolts, this seat being recessed at 14 for reception of the retaining boss 13 on the nuts 11, all as clearly described in connection with the embodiment shown in Figs. 1, 2 and 3, it being understood that in the present instance the counterweight assembly including the saddle, the weights and the saddle-supporting bolts are substantially the same as those described in the aforesaid embodiment. For the corresponding parts of the embodiment shown in Figs. 4 and 5, the same reference numerals are used as previously used in describing the embodiment shown in Figs. 1 to 3, inclusive.

In the present instance, instead of utilizing the pins 32 and associated parts for supporting the saddle and weights in the inoperative position, I provide a cradle 36 formed as clearly illustrated to receive and support the crank weight assembly when the latter is released from the crank member 35 in the manner previously described. In the present instance, the cradle is provided with a semi-circular base member 37 which lies closely adjacent the peripheries of the weight elements 21, 22 and 23, when the latter are secured to the crank member 35, as shown in Fig. 4. By loosening the nuts 11 and 15, the entire counterweight assembly may be lowered until the outer ends of the weight elements rest upon the curved supporting member 37. When thereafter the bolts 8 are thrown back against the saddle as described above, the counterweight assembly is entirely separated from the shaft 1 and the crank member 35, leaving the latter free to rotate in normal operation without the counterweights.

In the present instance, side plates 38 are provided in the cradle to support the semi-circular base member 37, these plates extending slightly above the said base member to form retaining flanges 39. These flanges, however, shown in Fig. 4 are cut away at the bottom of the cradle to facilitate withdrawal of the weights 21, 22 and 23 when the latter are released from the saddle in obvious manner.

It will be apparent in this embodiment also that the counterweight assembly when removed from the crank member 35 is supported closely adjacent the periphery of the crank member and in a position facilitating its re-attachment.

Under certain conditions well known to those familiar with oil well practice, it is desirable to have the radial line through the center of gravity of the counterweight assembly either lead or follow the radial line of the crank, and one of the valuable features of the aforedescribed devices resides in the ability to afford by a simple adjustment this relative positioning of the counterweights and the crank. In both of the embodiments described, the counterweight assembly may be made to lead or follow the crank to a limited extent by a simple adjustment of the weight elements longitudinally of the saddle.

In some instances, it may be desirable to have the counterweights lead or follow the crank to an angular extent greater than can be accomplished by an adjustment of the weight elements on the saddle. This is provided for in the embodiment shown in Figs. 1 to 3, inclusive, in which the saddle embraces approximately 180°, whereas the angular space between the radial sets of crank pin holes is only 120°. In this case, provision is made for securing the saddle to the disk in three different positions corresponding to the different crank positions as previously described, and by adjusting the saddle to one or other of these positions and by further adjusting the counterweights on the saddle, any desired degree of lead or lag between any one of the crank positions and the center of gravity of the counterweight assembly may be obtained.

There may be still other modifications without departure from the essential features of the invention as outlined in the appended claims.

I claim:

1. The combination with a crank shaft, of a member secured to said crank shaft and having a part concentric therewith, a substantially semicircular saddle adapted to be detachably secured to the concentric part of said member, and counterweight means adjustable on the said saddle to vary the angular relation thereof with respect to the shaft.

2. The combination with a crank shaft, of a crank member comprising means for detachably supporting the crank pin selectively in a plurality of effective crank positions angularly arranged with respect to each other, a counterweight assembly comprising a base member and a plurality of counterweight elements adjustable on said member to vary their angular relation with respect to the shaft, and means for securing said base member to said crank member in a plurality of different positions corresponding with the said different crank positions.

3. The combination with a crank shaft, of a crank member including means for detachably supporting the crank pin selectively in a plurality of crank positions angularly arranged with respect to the shaft, a counterweight assembly including relatively adjustable weight elements, and means providing for the attachment of said assembly to the crank shaft in a plurality of positions corresponding with the said crank positions.

4. The combination with a crank shaft, of a circular crank member mounted concentrically on said shaft, an arcuate saddle adapted to be detachably secured to the periphery of the crank member, and at least one element adjustable longitudinally of the saddle to vary the angular relation of said element with respect to the shaft.

5. The combination with a crank shaft, of a crank member having a curved peripheral portion concentric with the shaft, an arcuate saddle adapted to be secured to the periphery of said curved portion, and a counterweight element adjustable longitudinally of the saddle.

6. The combination with a crank shaft, of a crank member having a curved peripheral portion concentric with the shaft, an arcuate saddle member adapted to be secured against the curved peripheral portion and so formed as to have a peripheral portion concentric with the shaft, and at least one weight element adjustable longitudinally of said peripheral concentric portion.

7. The combination with a crank shaft, of a member attached to said shaft and having a curved peripheral portion concentric with the shaft, an arcuate saddle member adapted to be attached to said curved peripheral portion and having its periphery also concentric with the shaft, a slot in the periphery of said saddle extending longitudinally thereof, and weight elements adapted to be detachably and adjustably secured in said slot.

8. The combination with a crank shaft, of a relatively fixed structure, a counterweight assembly adapted to be detachably connected with said shaft, and means on said relatively fixed structure for detachably supporting the counterweight assembly in a position closely adjacent the part to which it is directly attachable.

9. The combination with a crank shaft, of a member secured to said shaft and having a curved peripheral portion concentric with the shaft, slots in the periphery of said member, a counterweight assembly comprising a plurality of relatively adjustable weight elements, a base element on which said weights are adapted to be adjustably mounted, bolts on said counterweight assembly adapted to enter the slots of said member, nuts on said bolts, and seats on said member for said nuts whereby the counterweight assembly may be secured against the periphery of said member.

10. The combination with a crank shaft, of a relatively fixed structure, a counterweight assembly adapted to be detachably secured to said shaft and comprising a slotted base member, and pins detachably mounted in said relatively fixed structure and adapted to be inserted through the slots of said counterweight assembly to support the assembly when released from the crank shaft.

11. The combination with a rotary shaft, of a crank carried by the shaft, and a counterweight assembly comprising a base member adapted to be detachably connected with the shaft in a predetermined position relative to the crank and at least one counterweight element adjustable on said base member to vary its angular position with respect to the shaft.

12. The combination with a rotary shaft of a crank carried by the shaft, and a counterweight assembly comprising a base member adapted to be detachably connected with the shaft in a predetermined position relative to the crank and a plurality of counterweight elements independently adjustable on the base member to vary their respective angular positions with respect to the shaft.

13. The combination with a rotary shaft, of a crank carried by the shaft, and a counterweight assembly comprising a base member adapted to be detachably connected with the shaft in a plurality of different positions angularly with respect thereto, and at least one counterweight element adjustable on the base member to vary its angular position with respect to the shaft.

14. The combination with a rotary shaft, of a crank carried by the shaft, and a counterweight assembly comprising a member angularly adjustable about the shaft and with respect to the crank and a counterweight element adjustable on said member angularly of the shaft.

15. The combination with a rotary shaft, of a crank carried by the shaft, and a counterweight assembly comprising a member angularly adjustable about the shaft and with respect to the crank and a plurality of counterweight elements adjustable independently on said member angularly of the shaft.

16. The combination with a rotary shaft, of a crank carried by the shaft, and having means for varying the effective crank position angularly with respect to the shaft, and a counterweight assembly including a member adjustable angularly of the shaft and embracing a greater angle than the angles between adjacent effective crank positions, and a plurality of counterweight elements adjustable on the said member angularly of the shaft.

17. The combination with a shaft, of a crank disk on said shaft, and a counterweight assembly adapted for attachment to said crank disk and comprising a plurality of independent counterweight elements relatively adjustable around the periphery of said disk, and means providing for detachment and attachment of said assembly without disturbing the relative setting of said elements.

18. The combination with a shaft, and a crank disk on said shaft, of a counterweight assembly comprising a member adapted to at least partially embrace the periphery of said disk and adapted for ready attachment and detachment thereto and therefrom, and a plurality of weight elements adjustable longitudinally of the said member to vary their positions around the periphery of said disk.

19. The combination with a shaft, and a crank disk thereon, of a counterweight assembly comprising a member adapted to be readily attached to the crank disk and detached therefrom and having when attached a part thereof concentric with the shaft, and at least one weight member adjustable on said concentric part to vary its position around the shaft in the plane of its adjustment.

20. The combination with a shaft, of a crank having recesses in opposite sides and shoulders intersected by said recesses, a counterweight member, means for supporting said member in a position adjacent to but radially removed from the crank, bolts on said member adjustably movable from a retracted position upwardly and inwardly into the respective recesses, and nuts on the bolts reactive with said shoulders to secure the counterweight member to the crank.

21. The combination with a shaft, of a crank, a counterweight member, bolts on said member engaging the crank to secure the member to the crank, means including elements movable into position under the counterweight member for supporting the member in a position adjacent to but radially removed from the crank, means for releasing the bolts to lower the counterweight onto the support, and means providing for retraction of the bolts from the path of the crank to permit free rotation of the latter without the counterweight.

22. The combination with a fixed structure, of a shaft, a crank on said shaft, a counterweight member, bolts on said member, nuts on the bolts reactive with the crank to secure the counterweight member thereto, elements on said fixed structure movable into positions underlying at least a portion of said counterweight member and constituting means for supporting the member in position adjacent to but radially removed from the crank, said support elements being adapted to receive the weight of said counterweight member when the said nuts are released, and means providing for retraction of the bolts after release of the nuts from engagement with and out of the path of said crank.

23. The combination with a fixed structure, of a rotary shaft, a crank on said shaft, a counterweight member having elongated openings therein, bolts on said counterweight member, and nuts on said bolts reactive with the crank to secure the counterweight member thereto, elements on said fixed structure adapted to be advanced into the elongated openings of said counterweight member whereby to receive and support said member when the nuts are released, and means providing for retraction of said bolts from engagement with the crank.

24. The combination with a rotary shaft, of a crank on the shaft, and a counterweight assembly comprising a member readily attachable and detachable to and from said crank, said member when detached being entirely disconnected both from the crank and the shaft, and a plurality of counterweight elements movable on said member angularly of the shaft.

25. The combination with a rotary shaft, of a crank on the shaft, and a counterweight assembly comprising a member readily attachable and detachable to and from said crank, said member when detached being entirely disconnected both from the crank and the shaft, a plurality of counterweight elements movable on said member angularly of the shaft, and means for supporting the said assembly when detached in position adjacent to that part of the crank to which it is immediately attachable to facilitate both attachment and detachment of the assembly.

26. The combination of a shaft, a device rotatable therewith, a counterweight detachably connected to the said device, a stationary support, and means carried by the support and detachably connected to the counterweight for suspending the counterweight and thereby relieving the shaft from friction due to the weight of the counterweight when detached from the said device.

GEORGE L. MOREHEAD.